July 30, 1940.    A. PERSON    2,209,827
EYEGLASS CONSTRUCTION
Filed Nov. 18, 1937
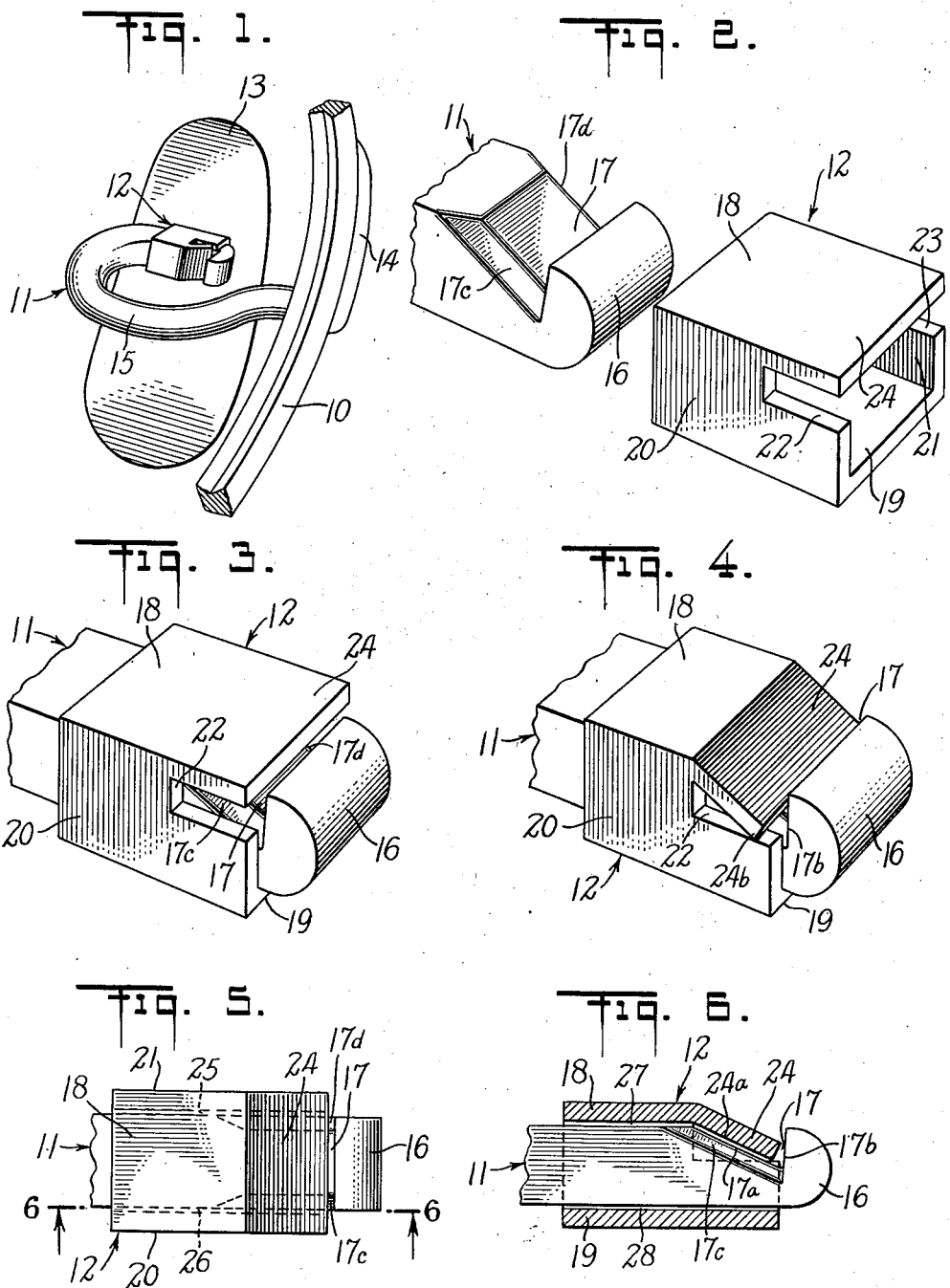
INVENTOR
*Axel Person*
BY
*Blair, Curtis, Dunne & Hayward*
ATTORNEYS

UNITED STATES PATENT OFFICE 2,209,827

EYEGLASS CONSTRUCTION

Axel Person, Attleboro, Mass., assignor to Bay State Optical Company, Attleboro, Mass., a corporation of Maine Application November 18, 1937, Serial No. 175,266

5 Claims. (Cl. 88—48)

This invention relates to eyeglass construction and more particularly to a mounting for a nose pad.

One of the objects of this invention is to provide in eyeglass construction a mounting for a nose pad which is simple and inexpensive in construction, sturdy, and thoroughly durable under conditions of rigorous use. Another object is to provide a mounting of the above nature which is neat and compact in appearance, and which positively and securely mounts a nose pad on an eyeglass frame or the like. Another object is to provide a mounting of the above nature by which a nose pad may be detachably and movably secured in operative position to an eyeglass frame. Other objects will be in part apparent and in part pointed out hereinafter.

The invention accordingly consists in the features of construction, combinations of elements, and arrangements of parts as will be exemplified in the structure to be hereinafter described and the scope of the application of which will be indicated in the following claims.

In the drawing, in which is shown one of the several possible embodiments of my invention, Figure 1 is a perspective view of a nose pad mounted on a portion of a rim;

Figure 2 is an enlarged fragmentary perspective view of my mounting in disassembled position;

Figure 3 is a fragmentary perspective view of the parts of my mounting in partial assembly;

Figure 4 is a fragmentary perspective view of my mounting in assembled condition;

Figure 5 is a top plan view of my assembled mounting; and,

Figure 6 is a sectional elevation of the assembled mounting taken along the line 6—6 of Figure 5.

As conducive to a clearer understanding of certain features of this invention, it should be noted that various difficulties are encountered in properly mounting nose pads on eyeglass frames or spectacles. Mountings of this nature should be positive, i. e., the pad should be securely locked in place to prevent inadvertent disassembly during wear, and at the same time the pad should be easily adjustable and conveniently removable for purposes of repair or replacement without damaging the pad or its mounting. Furthermore, a certain amount of universal rocking movement between the pad and frame is desirable to permit comfortable fitting of the pad on the nose. Excessive movement of this nature is detrimental, however, in that it not only weakens the structure, but is often a source of discomfort. Occasionally the substitution of pads is desirable and this should be accomplished without disturbing the position of the pad supporting arms as they are usually adjusted to their proper positions when the glasses are originally fitted to the wearer. As stated above, a certain amount of movement or play between the pad and its supporting arm is desirable, and in certain instances, necessary. The provision for this movement, however, is often a source of trouble, as continued use of the glasses results in wear and corrosion, which in turn permit excessive movement of the pads.

Ease of assembly and a neat, compact appearance are desirable but difficult of attainment, as is exemplified in many mountings of this nature. Other mountings are characterized more by the above-noted difficulties than by the desirable features mentioned. It is accordingly another object of this invention to provide a nose pad mounting incorporating these desirable features, but avoiding the undesirable ones.

Referring now to the drawing, a lens retaining part or rim 10 (Figure 1) has secured thereto in any suitable manner an arm or nose guard support generally indicated at 11. The free end of this arm is secured to a nose pad mounting generally indicated at 12, mounting 12 in turn being secured to a nose pad 13.

Arm 11 preferably includes a rim following portion 14, which may be soldered or otherwise secured to rim 10. Arm 11 extends outwardly from the bottom of rim portion 14 to form a loop 15, which extends substantially rearwardly of the plane of rim 10. The end portion of arm 11 is substantially rectangular in shape (Figure 2) and pad 13 is secured thereto in a manner to be more fully described hereinafter.

With reference to Figure 2, the free end portion 16 of arm 11 is provided with a notch 17 facing inwardly of loop 15, as shown in Figure 1. Notch 17 has a flat surface 17a and beveled edges 17c and 17d. Mounting 12 (Figure 2) is also preferably rectangular in shape and comprises a box-like fitting having a top 18, a parallel bottom 19 and parallel sides 20 and 21, sides 20 and 21 being provided respectively with slots 22 and 23 which form a tongue 24 lying in the general plane of top 18. Mounting 12 is preferably formed of a malleable alloy which may be bent as desired without springing back from its bent position.

As is more clearly shown in Figures 5 and 6, the dimensions of a transverse section of arm 11 are less than the corresponding dimensions of mounting 12, thus providing spaces 25 and 26

(Figure 5) between the sides of arm 11 and the inner sides of mounting 12, and spaces 27 and 28 (Figure 6) between the top and bottom or arm 11 and the top and bottom of mounting 12, for a purpose hereinafter described.

Bottom 19 of mounting 12 may be secured in any suitable manner to nose pad 13 (Figure 1) so that the top portion 18 of the mounting faces inwardly of loop 15 when mounted. The mounting and nose pad thus comprise a unit which may be readily assembled with arm 11 in a manner to be described. Referring to Figure 3, arm 11 is inserted through mounting 12 until the end portion 16 of the arm projects from the right-hand end of the mounting, as viewed in Figure 3. Tongue 24 of mounting 12 is positioned directly over notch 17 and may be bent into notch 17 (see Figures 4 and 6). When tongue 24 (Figure 6) is thus bent, its under surface 24a is parallel to but slightly spaced from surface 17a of notch 17. Also, the bottom edge 24b of the tongue (Figure 4) rests on the bottom surfaces of notches 22 and 23, and the right-hand edge of tongue 24 (Figure 6) lies behind and spaced from the vertical surface 17b of notch 17. When the tongue is so positioned, arm 11 is positively retained within mounting 12 and is movable universally therein but only to the extent provided by openings 25, 26, 27 and 28 (Figures 5 and 6) and by the space between tongue 24 and notch surface 17a, as well as the beveled surfaces 17c and 17d. These spaces provide for ample movement between nose pad 13 and arm 11 (Figure 1) to permit the nose pad to be comfortably worn, but prevent excessive movement between the pad and the arm which might cause excessive wear or discomfort.

It should be noted at this point that mounting 12, and accordingly nose pad 13 may be secured to the end of arm 11 without in any manner disturbing the position of the arm. Hence, in a case where substitution of pads is necessary, pad 13 is readily attachable to arm 11 without disturbing the originally adjusted position of the arm.

Quite often nose pads become damaged or excessively worn so that replacement thereof is desirable. Removal of my pad 13 from arm 11 is readily effected by inserting a suitable tool, such as a knife, into slot 22 or 23 (Figure 4) and prying tongue 24 upwardly, whereupon arm 11 may readily be withdrawn from mounting 12 without disturbing the position of the arm. The nose pad may then be repaired and replaced as noted above, or a new nose pad may be assembled.

Because of the rectangular form of arm 11 in mounting 12, it is impossible for mounting 12 to pivot about arm 11 beyond the extent permitted by spaces 25, 26, 27 and 28, and beveled surfaces 17c and 17d. Excessive rocking movement, axially of arm 11, is also limited by these spaces, the size of which can be varied as desired. The generally rectangular shape of arm 11 and mounting 12 further results in a neat, compact appearance, and effectively provides a simple mounting by which the nose pad can easily be attached to or detached from the eyeglass frame. Also, slots 22 and 23 (Figure 2) in mounting 12 provide the integral tongue 24 which is easily depressed into notch 17 (Figure 4) of arm 11, and which cannot be inadvertently disengaged.

Thus it may be seen that I have provided a nose pad mounting which effectively and practicably attains the several advantages noted hereinabove, and obviates the difficulties referred to.

As many possible embodiments may be made of the above invention, and as many changes might be made in the embodiment above set forth, it is to be understood that all matter hereinbefore set forth, or shown in the accompanying drawing, is to be interpreted as illustrative and not in a limiting sense.

I claim:

1. In eyeglass construction, in combination, a supporting arm having a free end with a notch therein, a nose pad, and a hollow mounting member secured to said nose pad and fitting over said arm, said mounting having slots in its sides to provide a top tongue portion bent down into said notch and said mounting being larger than said arm to provide play therebetween.

2. As an article of manufacture, a nose pad having a mounting part comprising a four-sided open ended part secured thereto with registering slots in its opposite side walls adjacent one end thereof to provide a top portion in the form of a tongue adapted to be bent into said slots to interfit with a notch in a supporting arm on an eyeglass frame.

3. In eyeglass construction, in combination, a nose pad, means forming a support for said nose pad, said support having a notch formed in a portion thereof, a box-shaped mounting part secured to said nose pad, said part having registering slots formed in the side walls thereof to provide an integral locking tongue thereon, said support being insertable through said mounting part to a position wherein said tongue may be bent into said notch to secure said mounting part to said support.

4. In eyeglass construction, in combination, a nose pad, an arm support for said nose pad having a free end, said arm having a notch with a squared edge adjacent said end and its bottom sloping upwardly from said squared edge, and a hollow mounting part secured to said nose pad and shaped to fit over said arm, said mounting having a pair of slots formed in the sides thereof to provide a bendable tongue on its top side whereby said tongue may be bent downwardly into said notch to secure said nose pad to said arm support.

5. In eyeglass construction, in combination, a nose pad, an arm support for said nose pad having a free end, said arm having a notch with a squared edge adjacent said end and its bottom sloping upwardly from said square edge, and a hollow mounting part secured to said nose pad and shaped to fit over said arm, said mounting having a pair of slots formed in its sides so that its top portion extends down into said notch with the end of the top portion adjacent said squared edge of said notch.

AXEL PERSON.